United States Patent [19]
Nemoto et al.

[11] Patent Number: 5,158,152
[45] Date of Patent: Oct. 27, 1992

[54] SYSTEM FOR LUBRICATING TRANSMISSION FOR VEHICLE

[75] Inventors: Keiji Nemoto; Kiyokazu Okubo; Sunao Ishihara; Takahito Takekawa, all of Wako, Japan

[73] Assignee: Honda Giken Kogyo Kabushiki Kaisha, Tokyo, Japan

[21] Appl. No.: 739,997

[22] Filed: Aug. 2, 1991

[30] Foreign Application Priority Data

Aug. 8, 1990 [JP] Japan .................. 2-83941[U]

[51] Int. Cl.$^5$ ............................................. F01M 1/00
[52] U.S. Cl. ...................................... 184/6.12; 74/467
[58] Field of Search ............... 184/6.12, 11.1, 13.1; 74/467

[56] References Cited

U.S. PATENT DOCUMENTS

| | | | |
|---|---|---|---|
| 1,220,810 | 3/1917 | Alquist | 184/6.12 |
| 2,211,363 | 8/1940 | Brenkert | 184/6.12 |
| 2,590,870 | 4/1952 | Keese | 184/6.12 |
| 3,529,698 | 9/1970 | Nelson | 184/6.12 |
| 4,329,887 | 5/1982 | Kawamoto | 74/467 |
| 4,429,587 | 2/1984 | Finn et al. | 184/6.12 |
| 4,541,510 | 9/1985 | Itoh et al. | 74/467 |
| 4,658,665 | 4/1987 | Strinzel et al. | 184/6.12 |
| 4,693,133 | 9/1987 | Tomita et al. | 184/6.12 |
| 4,754,846 | 7/1988 | Sulzer, Jr. et al. | 184/6.12 |

FOREIGN PATENT DOCUMENTS

| | | |
|---|---|---|
| 0294697 | 12/1988 | European Pat. Off. |
| 1448079 | 9/1976 | United Kingdom |
| 2116645 | 9/1983 | United Kingdom |

Primary Examiner—Ira S. Lazarus
Assistant Examiner—Alan B. Cariaso
Attorney, Agent, or Firm—Lyon & Lyon

[57] ABSTRACT

A system for lubricating a transmission for a vehicle includes an auxiliary oil reservoir placed in the transmission case apart from transmission gears, an oil pump in the transmission case operated interlockingly with an output shaft of the transmission for pumping lubricating oil stored in the bottom of the case into the auxiliary oil reservoir, and a circulating means provided in the auxiliary oil reservoir for regulating the amount of oil circulated from the auxiliary oil reservoir into the transmission case, such that the amount of oil in the auxiliary oil reservoir is increased or decreased in accordance with a respective increase or decrease in the amount of oil discharged from the oil pump. This system allows the amount of lubricating oil stored in the transmission case to be reduced in accordance with an increase in vehicle speed, while ensuring the transmission is lubricated to a sufficient extent at all times by an oil splash scattered from the gears over the vehicle's full operating range, while avoiding attendant power loss and excessive rise in oil temperature which may otherwise result during high speed operation.

6 Claims, 5 Drawing Sheets

SYSTEM FOR LUBRICATING TRANSMISSION FOR VEHICLE

BACKGROUND OF THE INVENTION

1. Field of the Invention

The field of the present invention is systems for lubricating a transmission for a motorized vehicle such as an automobile, or a motorcycle and particularly, improvements of such systems in which a lubricating oil is stored in a bottom of a transmission case containing the transmission, with gears of the transmission being partially immersed in the lubricating oil, so that the lubricating oil is scattered by rotation of the gears, thereby lubricating various portions of the transmission by a resulting oil splash.

2. Description of the Prior Art

In such a conventional transmission lubricating system, a specified amount of a lubricating oil is stored in the transmission case and, therefore, the oil level within the transmission case is always constant irrespective of the operational condition of the transmission.

In the above conventional transmission lubricating system, if the oil level within the transmission is set relatively high in order to supply a sufficient oil splash to various portions of the transmission during low speed operation of the vehicle, the lubricating oil may be stirred or violently agitated by the rotating gears during high speed operation, not only resulting in an increase in attendant power loss, but also bringing about a rise in the oil temperature. Conversely, if the oil level is set relatively low, in order to avoid unecessary stiring and agitation while still supplying a sufficient oil splash during high speed operation, then a sufficient splash is not provided during low speed operation, resulting in underlubrication. Therefore, it is difficult to effect the lubrication of the gears to a sufficient extent at all times over a full operating range of the vehicle, i.e., from the lowest speed to the highest speed. The higher the maximum vehicle speed, the more problematic this becomes.

SUMMARY OF THE INVENTION

Accordingly, it is an object of the present invention to provide a lubricating system of the type described above, wherein various portions of the transmission are lubricated to a sufficient extent over a full operating range of the vehicle.

To achieve the above object, according to the present invention, there is provided a system for lubricating a transmission for a vehicle, in which a lubricating oil is stored in a bottom of a transmission case containing the transmission, with gears of the transmission being partially immersed in the lubricating oil, wherein the system comprises: an auxiliary oil reservoir disposed in the transmission case and spaced from the gears of the transmission; an oil pump disposed in the transmission case and operated interlockingly with an output shaft of the transmission for pumping the lubricating oil stored in the bottom of the transmission case into the auxiliary oil reservoir; and a circulating means provided in the auxiliary oil reservoir for regulating the amount of oil circulated from the auxiliary oil reservoir into the transmission case, wherein the amount of oil stored in the auxiliary oil reservoir is increased or decreased in accordance with a respective increase or decrease in an amount of oil discharged from the oil pump.

In a preferred embodiment, the oil pump is driven by an interlocking output shaft of the transmission during operation of the vehicle, so that the amount of oil discharged from the transmission case into the auxiliary oil reservoir by the oil pump is increased in accordance with a respective increase in the vehicle speed. On the other hand, the amount of oil stored in the auxiliary oil reservoir is decreased in accordance with the amount of oil discharged by the steady state function of the circulating means. As a result, the oil level within the transmission case becomes relatively high during low speed operation of the vehicle and is gradually reduced as the vehicle increases speed. Therefore, during low speed operation, the portion of the transmission gears immersed in the lubricating oil is relatively large, so that the oil can be scattered sufficiently, even by low speed rotation of the gears, thereby providing satisfactory lubrication. During high speed operation, the amount of immersion is relatively small, thereby minimizing the stirring and agitation of the oil by the gears and avoiding an increase in power loss and an excessive rise in oil temperature, while still providing a sufficient oil splash from the high speed rotation of the gears.

The above and other objects, features and advantages of the invention will become apparent from the following description of a preferred embodiment, taken in conjunction with the accompanying drawings.

BRIEF DESCRIPTION OF THE DRAWINGS

The accompanying drawings illustrate a preferred embodiment of the present invention, wherein.

DESCRIPTION OF THE PREFERRED EMBODIMENT

The embodiment shown of the present invention will now be described in connection with the accompanying drawings.

Figure 1:
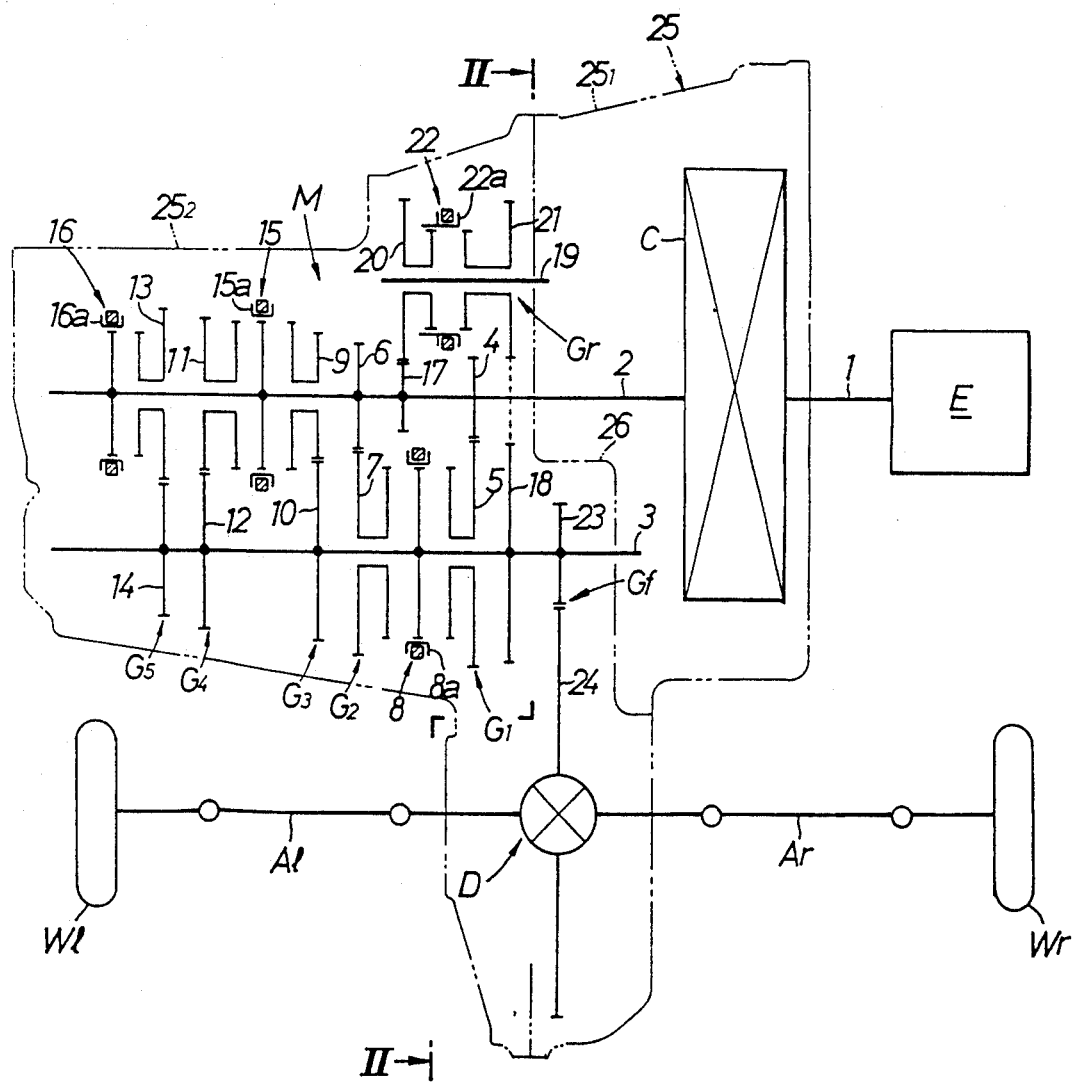
FIG. 1 is a schematic illustration of a power unit for an automobile provided with a transmission which is lubricated by means of a lubricating system of the embodiment.
Figure 2:
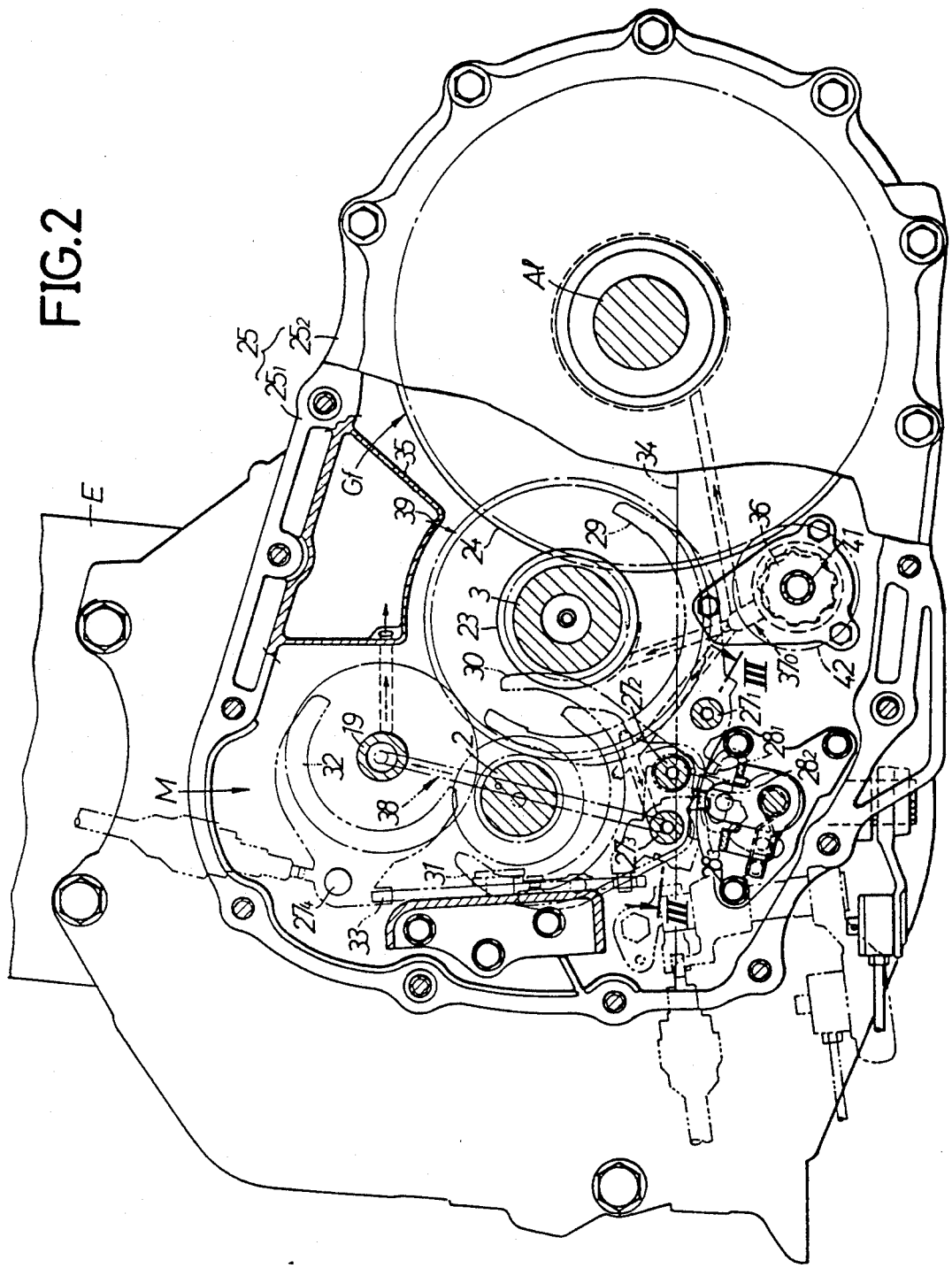
FIG. 2 is a sectional view taken along a line II—II in FIG. 1.

FIG. 1 is a schematic illustration of a power unit for an automobile provided with a transmission M which has five forward stages and a single reverse stage, and FIG. 2 is a sectional view taken along a line II—II in FIG. 1. In these Figures, power from an engine E is transmitted from a crankshaft 1 sequentially via a clutch C, the transmission M and a differential gear D, respectively, to a pair of wheel driving axles Al and Ar, which in turn drive left and right wheels, Wl and Wr, respectively.

In the transmission M, an input shaft 2 is disposed coaxially with the crankshaft 1, and an output shaft 3 is disposed parallel to the input shaft 2, with clutch C interposed between said transmission and said crankshaft. In sequence from the engine E side, a reverse gear train Gr and first to fifth forward gearshift gear trains $G_1$ to $G_5$, respectively, are disposed between the input and output shafts 2 and 3, respectively.

The first and second gearshift gear trains $G_1$ and $G_2$, comprise input gears 4 and 6, respectively, which are fixedly mounted on the input shaft 2, and output gears 5 and 7, respectively, which are rotatably carried on the output shaft 3 and are normally meshed with input gears 4 and 6, respectively. A first-second gearshift synchronizing device 8 is mounted between the output gears 5 and 7 for alternately coupling said output gears to the output shaft 3.

The third to fifth gearshift gear trains $G_3$ to $G_5$, respectively, comprise input gears 9, 11, and 13, respectively, which are rotatably carried on the input shaft 2, and output gears 10, 12, and 14, respectively, which are fixedly mounted on the output shaft 3 and normally meshed with the input gears 9, 11, and 13, respectively. A third-fourth gearshift synchronizing device 15 is mounted between input gears 9 and 11 for alternately coupling said input gears to the input shaft 2. A fifth gearshift synchronizing device 16 is mounted on one side of the fifth gearshift input gear 13 for coupling gear 13 to the input shaft 2.

The reverse gear train Gr comprises an input gear 17 fixedly mounted on the input shaft 2, an output gear 8 fixedly mounted on the output shaft 3, and first and second intermediate gears 20 and 21, which are rotatably carried on an intermediate shaft 19, which itself is disposed between and parallel to the input and output shafts, 2 and 3, respectively. Intermediate gears 20 and 21, are normally meshed with the input and output gears 17 and 18, respectively. A reverse gearshift synchronizing device 22 is mounted between intermediate gears 20 and 21, for coupling said gears.

Thus, if output gear 5 or 7 is coupled with output shaft 3 through the first-second gearshift synchronizing device 8, the first gearshift gear train $G_1$ or the second gearshift gear train $G_2$, respectively, is established. If input gear 9 or 11 is coupled with input shaft 2 through the third-fourth gearshift synchronizing device 15, the third gearshift gear train $G_3$ or the fourth gearshift gear train $G_4$, respectively, is established. If input gear 13 is coupled with input shaft 2 through the fifth gearshift synchronizing device 16, the fifth gearshift gear train $G_5$ is established. If intermediate gears 20 and 21 are coupled with each other through the reverse gearshift synchronizing device 22, the reverse gear train Gr is established.

Once established, a gear train permits the power from the engine E to be transmitted at a predetermined shift ratio from the input shaft 2 to the output shaft 3. The power transmitted to the output shaft 3 is then transmitted through a final reduction gear train Gf to the differential gear D. The final reduction gear train Gf comprises an input gear 23, which is fixedly mounted on the output shaft 3, and an output gear 24, which is secured to a differential case for the differential gear D and has a diameter larger than that of the input gear 23.

A transmission case 25 for containing the clutch C, the transmission M and the differential gear D, respectively, is comprised of a first case portion 25, which is bonded to an end face of the engine E and contains the clutch C, and a second case portion $25_2$, containing the transmission M. The first and second case portions, $25_1$ and $25_2$, respectively, are bonded to each other. The differential gear D is contained within transmission case 25 and is bridged over case portions $25_1$ and $25_2$, respectively. A partition wall 26 is disposed between case portions $25_1$ and $25_2$, and is integral with the first case portion $25_1$, creating a dry chamber in which the clutch C is disposed, and a wet chamber in which the transmission M and the differential gear D are disposed.

Figure 3:
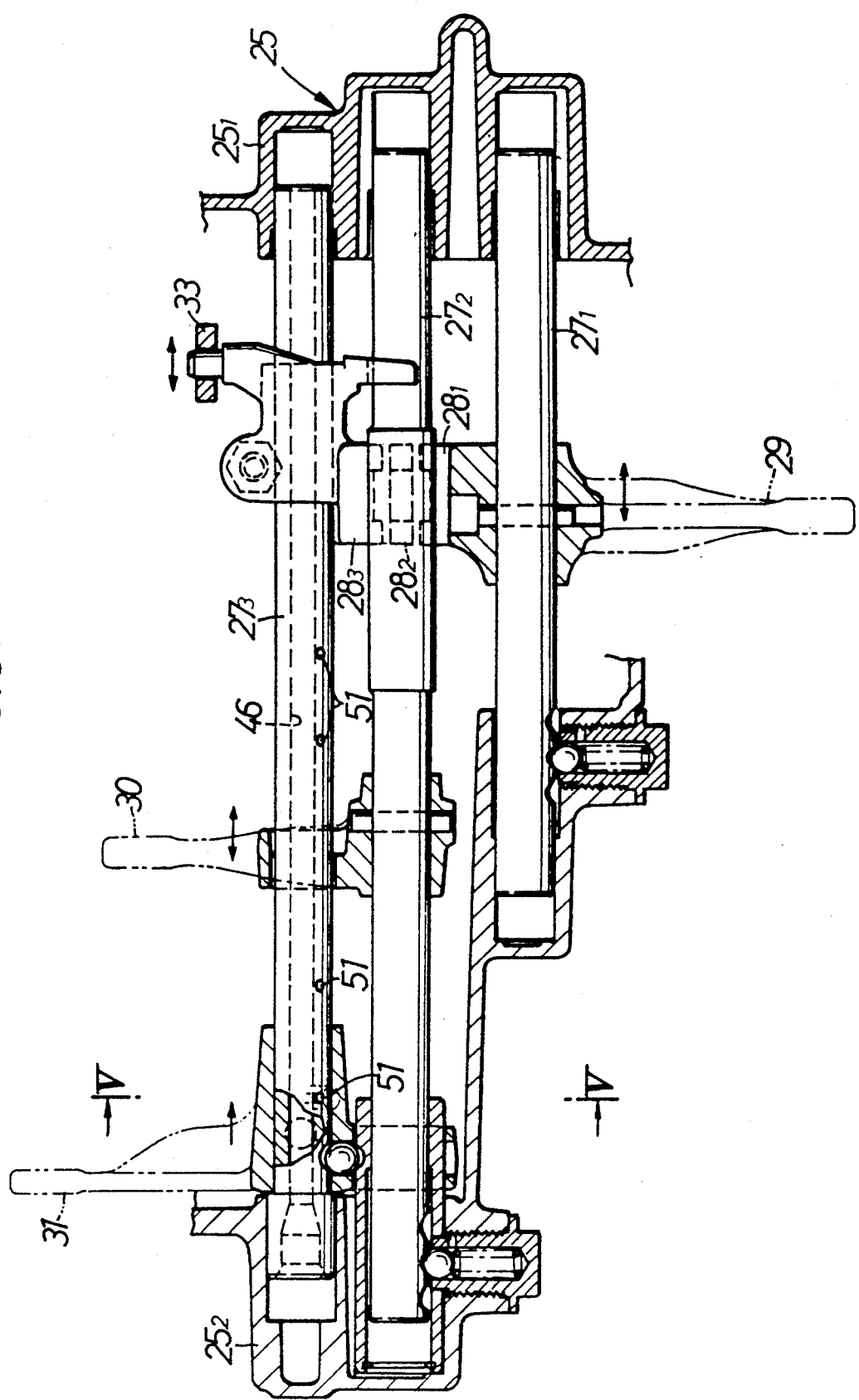
FIG. 3 is a sectional view taken along a line III—III in FIG. 2.

A change mechanism for controlling the transmission M includes first to fourth fork shafts $27_1$ to $27_4$, respectively, which extend parallel to the input and output shafts 2 and 3, and are slidably carried in the first and second case portions, $25_1$ and $25_2$, respectively, as shown in FIGS. 2 and 3. The first to third fork shafts $27_1$ to $27_3$, respectively, are disposed adjacent one another, below the input and output shafts 2 and 3, with the fourth fork shaft $27_4$ disposed above the input shaft 2.

First to third shifting pieces, $28_1$ to $28_3$, respectively, are fixedly mounted to the first to third fork shafts, $27_1$ to $27_3$, respectively, at positions adjacent one another, so that any one of the shifting pieces, $28_1$ to $28_3$, may be selected by the selecting and shifting motions of a change lever (not shown). A corresponding fork shaft is axially shifted through the selected shifting piece.

A first-second gearshift shifting fork 29 is secured to the first fork shaft 27, and engages a slide sleeve $8a$ of the first-second gearshift synchronizing device 8. In the illustrated embodiment, the shifting fork 29 is integral with the first shifting piece $28_1$. A third-fourth gearshift shifting fork 30 is secured to the second fork shaft $27_2$, and engages a slide sleeve $15a$ of the third-fourth gearshift synchronizing device 15. A fifth gearshift shifting fork 31 is secured to the third fork shaft $27_3$, and engages a slide sleeve $16a$ of the fifth gearshift synchronizing device 16. A reverse shifting fork 32 is secured to the fourth fork shaft $27_4$, and engages a slide sleeve $22a$ of the reverse synchronizing device 22. Fork 32 is connected to the third gearshift shifting piece $28_3$ through an interlocking lever 33.

FIG. 3 shows a neutral state of fork shafts $27_1$ to $27_4$, respectively. If the first fork shaft $27_1$ is shifted rightwardly or leftwardly from this state, either the first gearshift gear train $G_1$ or the second gearshift gear train $G_2$, respectively, is established. If the second fork shaft $27_2$ is shifted rightwardly or leftwardly from the neutral state, either the third gearshift gear train $G_3$ or the fourth gearshift gear train $G_4$, respectively, is established. Further, if the third fork shaft $27_3$ is shifted rightwardly or leftwardly from the neutral state, either the fifth gearshift gear train $G_5$ or the reverse gear train Gr, respectively, is established.

Figure 4:
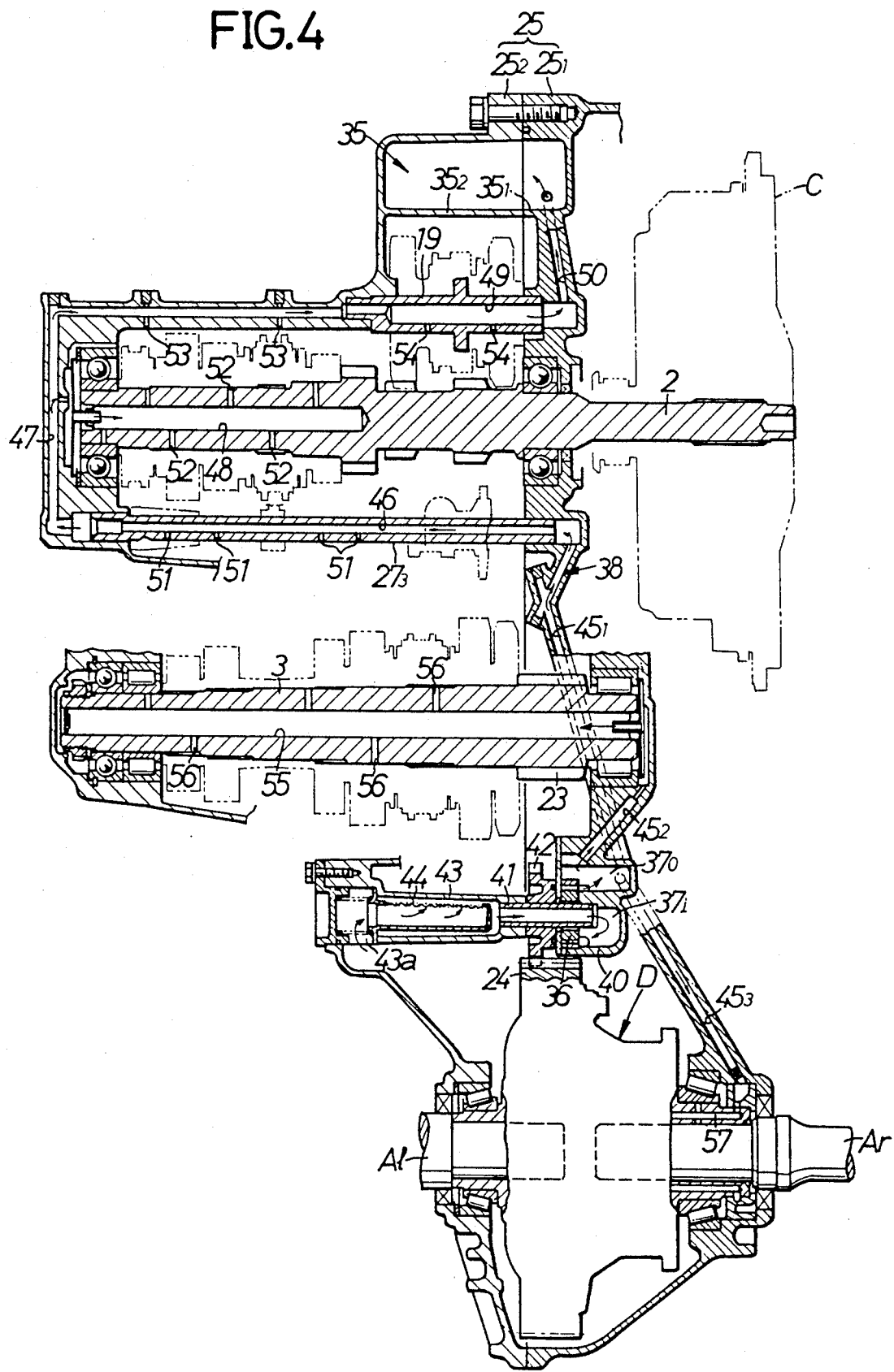
FIG. 4 is a longitudinally sectioned view of an essential portion of the transmission, illustrating in a developed manner, a path along which the lubricating oil is supplied from an oil pump.

As shown in FIGS. 2 and 4, a lubricating oil 34 is stored in the bottom of the transmission case 25, with output gears 5, 7, 10, 12, 14, 18 and 24 being partially immersed in the lubricating oil 34. An auxiliary oil reservoir 35 is provided in an upper portion of the transmission case 25 and is spaced from said output gears. The auxiliary oil reservoir 35 is comprised of a pair of oil reservoir halves, $35_1$ and $35_2$, respectively, said reservoir halves formed in abutting surfaces of the first and second case portions, $25_1$ and $25_2$, respectively, with opened surfaces of the halves being mated with each other. With such a construction, the auxiliary oil reservoir 35 is formed integrally with the transmission case 25.

Referring to FIGS. 2 and 4, the auxiliary oil reservoir 35 is connected via an oil passage 38 (described hereinafter) with an oil pump 36. Pump 36 operates to pump up the lubricating oil 34 stored in the bottom of the transmission case 25. The bottom of reservoir 35 is provided with a small hole 39, which connects the inside of the auxiliary oil reservoir 35 with the interior of transmission case 25. The small hole 39 serves as a circulating means for regulating the amount of oil circulated from the auxiliary oil reservoir to the transmission case in the illustrated embodiment.

The oil pump 36 is constructed into a trochoidal type and is mounted on a pump housing 40, integral with the first case portion $25_1$. A drive gear 42 is secured to a pump shaft 41 of the oil pump 36 and meshed with the output gear 24 of the final reduction gear train Gf. Thus, the pump shaft 41 is operatively connected to the output shaft 3 of the transmission M through the final reduction gear train Gf.

The pump shaft 41 is carried at one end on the pump housing 40 and at the other end on a strainer housing 43 integral with the second case portion $25_2$. The strainer housing 43 is located at the bottom of the transmission case 25 and is typically immersed in the lubricating oil 34. The strainer housing 43 has an inlet 43a at one end. A strainer 44 is mounted within the strainer housing 43.

The pump housing 40 is provided with an inlet port 37i and an outlet port 37o for the oil pump 36. The inlet port 37i accesses the strainer housing 43 through a hollow bore in the pump shaft 41. Thus, during operation, the oil pump 36 draws the lubricating oil 34 through inlet 43a and into the strainer housing 43, where the oil is filtered in the strainer 44 and then drawn into the oil pump 36 through the pump shaft 41.

First to third distributer passages, $45_1$ to $45_3$, respectively, are defined in a wall of the first case portion $25_1$ so as to extend[ed] from the outlet port 37o.

As shown in FIG. 4, the first distributer passage $45_1$ accesses a right end of an oil supply passage 46. Passage 46 extends through a central portion of the third fork shaft $27_3$. A left end of passage 46 connects to a pouched oil supply passage 48 formed in the input shaft 2 and also connects to a left end of an oil supply passage 49, which extends through a central portion of the intermediate shaft 19 via a connector port 47 in a wall of the second case portion $25_2$. A right end of the oil supply passage 49 accesses the auxiliary oil reservoir 35 via a restricting hole 50. The first distributor passage $45_1$, oil supply passage 46, connector port 47, oil supply passage 49, and the restricting hole 50, respectively, comprise oil passage 38, which permits access between the oil pump 36 and the auxiliary oil reservoir 35.

Figure 5:
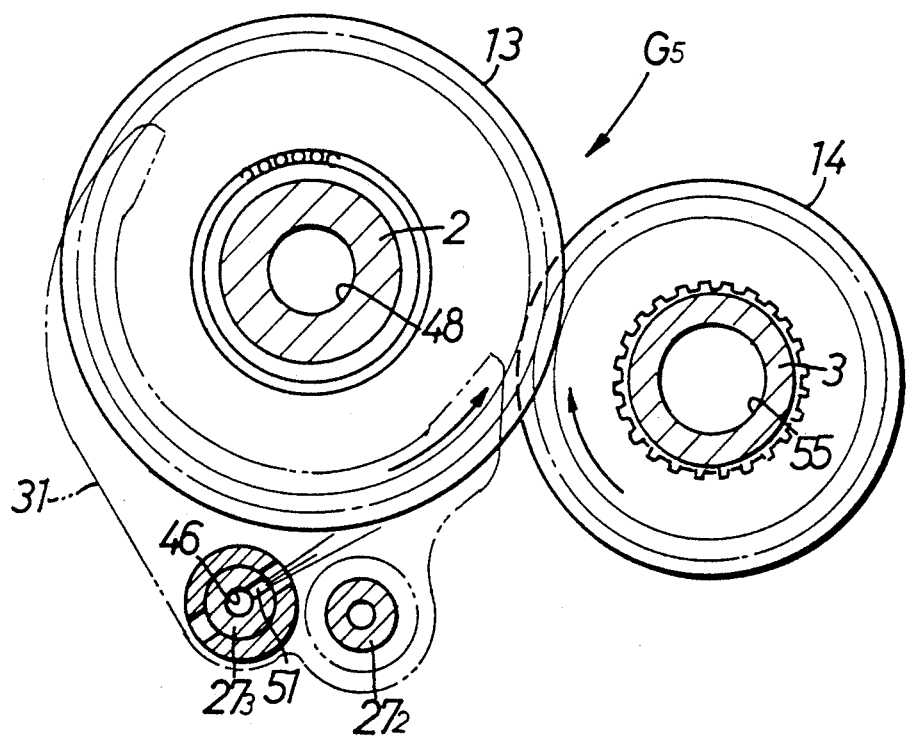
FIG. 5 is a sectional view taken along a line V—V in FIG. 3.

A plurity of ejecting holes 51, are provided in the third fork shaft $27_3$, at axial distances from one another, and extend from the oil supply passage 46 to an [a] outer peripheral surface of the third fork shaft. In the embodiment shown, the ejecting holes 51 are positioned so as to permit [eject] the lubricating oil to be ejected toward meshing-start sides of meshed portions of the second to fifth gearshift gear trains $G_2$ to $G_5$, respectively, as shown in FIGS. 4 and 5.

A plurality of ejecting holes 52, are provided in the input shaft 2, and extend from the oil supply passage 48 to an outer peripheral surface of the input shaft 2, so that the lubricating oil can be supplied through the ejecting holes 52, to the various gears disposed on said input shaft 2.

Further, a plurality of ejecting holes 53, are provided in an upper wall of the first case portion $25_1$, parallel to the input shaft 2, and extending from passage 47 to an inner surface of said upper wall, so that the lubricating oil can be supplied through the ejecting holes 53, toward the various synchronizing devices.

A plurality of further ejecting holes 54, are also provided in the intermediate shaft 19 at axial distances from one another, and extend from oil supply passage 49 to an outer peripheral surface of the intermediate shaft 19, so that the lubricating oil can be supplied through the ejecting holes 54, to gears 20 and 21, respectively, which are disposed on said intermediate shaft 19.

The second distributer passage $45_2$ accesses an oil supply passage [hole] 55, which extends through a central portion of the output shaft 3. A plurality of ejecting holes 56, are provided in the output shaft 3 at axial distances from one another, and extend from oil supply passage 55 to an outer peripheral surface of the output shaft 3, so that the lubricating oil can be supplied through the ejecting holes 56, to the gears on said output shaft 3.

The third distributer passage $45_3$ accesses various portions of the differential gear D via an oil supply passage 57, so that the lubricating oil can be supplied to said various portions of said differential gear D.

The operation of this preferred embodiment is as follows:

When a vehicle is travelling, the pump shaft 41 of the oil pump 36 is rotated interlockingly with the output shaft 3 of the transmission M, so that the oil pump 36 pumps the lubricating oil 34 from the bottom of the transmission case 25 and discharges it through outlet port 37o. The oil is distributed to the first through third distributor passages, $45_1$ to $45_3$, respectively, and supplied to the various portions of the transmission which are to be lubricated.

Specifically, the oil ejected from the ejecting holes 51, in the third fork shaft $27_3$ is supplied to the meshing-start sides of the meshed portions of the second through fifth gearshift gear trains, $G_2$ to $G_5$, respectively. Hence, with the rotation of each of the gear trains, $G_{[1]2}$ to $G_5$, respectively, the oil is then drawn to the meshed portion of said gear trains to effectively lubricate the gear tooth surfaces.

Further, gears 5, 7, 10, 12, 14, 18 and 24, respectively, each of which is partly immersed in the lubricating oil, [34] scatter the oil [34] as they rotate, so that an oil splash is supplied to various portions of the transmission M. Thus, the various portions of the transmission are lubricated from both the inside and outside thereof.

Approximately halfway along oil passage 38, the lubricating oil supplied from the oil pump 36 to the first distributor passage $45_1$ is partly ejected through the ejecting holes 51, 52, 53 and 54, respectively, for lubrication, with the remaining oil passing through the oil passage 38 into the auxiliary oil reservoir 35. Moreover, since the oil pump 36 is operatively connected to the output shaft 3 of the transmission M, the amount of lubricating oil transferred from the bottom of the transmission case 25 to the auxiliary oil reservoir 35 is increased in accordance with any increase in the vehicle speed.

On the other hand, the oil delivered to the auxiliary oil reservoir 35 is discharged to the transmission case 25 through the small hole 39 at a substantially constant flow rate. As a result, the level of the lubricating oil 34 stored in the bottom of the transmission case 25 is relatively high when the vehicle is operating at a low speed, and is lowered in accordance with increases in the vehicle's speed. It follows that at low vehicle speed, the portion of the gears of the transmission M immersed in the lubricating oil 34 is relatively large, ensuring that the oil is sufficiently scattered, even by low speed rotation of the gears, and thereby providing satisfactory lubrication. At higher vehicle speeds, the amount of immersion is relatively small, since less oil is required to be sufficiently scattered by high speed rotation of the gears to provide satisfactory lubrication. At the same time, reducing the level of immersion of the gears minimizes agitation of the oil by the gears.

What is claimed is:

1. A system for lubricating a transmission for a vehicle, in which a lubricating oil is stored in a bottom of a transmission case containing the transmission, with gears of the transmission being partially immersed in the lubricating oil, said system comprising:

an auxiliary oil reservoir disposed in the transmission case and spaced from the gears of the transmission;

an oil pump disposed in the transmission case and operated interlockingly with an output shaft of the transmission for pumping the lubricating oil into the auxiliary oil reservoir via an oil supply passage which extends through a fork shaft of the transmission, said fork shaft being provided with ejecting holes for permitting a portion of the lubricating oil to be ejected from said fork shaft toward meshed portions of the gears of the transmission; and a circulating means provided in said auxiliary oil reservoir for regulating the amount of oil circulated from said auxiliary oil reservoir into the transmission case, such that the amount of oil stored in said auxiliary oil reservoir is increased or decreased in accordance with a respective increase or decrease in the amount of oil discharged from the oil pump.

2. The system for lubricating a transmission for a vehicle in claim 1, wherein said circulating means comprise a small hole provided in a lower portion of said auxiliary oil reservoir to permit access between an interior of said auxiliary oil reservoir with an interior of the transmission case.

3. The system for lubricating a transmission for a vehicle according to claim 1, wherein said ejecting holes direct the lubricating oil ejected therethrough toward meshing-start sides of the meshed portions of the gears.

4. A system for lubricating a transmission for a vehicle, in which the transmission is contained in a case and includes gears partially immersed in lubricating oil stored in the case, and in which a fork shaft is used for gear shifting, said fork shaft being provided with an oil supply passage therein and ejecting holes for ejecting lubricating oil fed through said oil supply passage toward the gears of the transmission, said system comprising an auxiliary oil reservoir disposed in the case in a manner spaced from the gears;

an oil pump disposed in the case and operable to pump up lubricating oil from a bottom of said case at a rate which varies in accordance with the operation of the transmission to the auxiliary oil reservoir; and means for circulating the oil in the reservoir into the case so as to effect an increase or decrease in the amount of oil stored in the auxiliary oil reservoir in accordance with a respective increase or decrease in the amount of oil discharged from the pump, wherein the oil pumped up by the pump is fed to said reservoir through said oil supply passage in said fork shaft.

5. The system for lubricating a transmission for a vehicle in claim 4, wherein the transmission includes portions to be lubricated other than said gears, said portions being connected to the oil pump via passages other than said oil supply passage.

6. The system for lubricating a transmission for a vehicle in claim 4, wherein the case comprises first and second case portions assembled together at abutting surfaces thereof, said auxiliary oil reservoir being formed of first and second halves mated together at opening surfaces thereof, said first and second halves being provided at the abutting surfaces of the first and second case portions, respectively.

* * * * *